United States Patent [19]

Huang

[11] Patent Number: 5,014,643
[45] Date of Patent: May 14, 1991

[54] TIRE PRESSURE INDICATOR

[76] Inventor: Tien-Tsai Huang, No. 4, Lane 30, Wu-Chang St., Pan-Chiao City, Taiwan

[21] Appl. No.: 467,496

[22] Filed: Jan. 19, 1990

[51] Int. Cl.$^5$ .................. B60C 23/04; G01L 19/12
[52] U.S. Cl. .................. 116/34 R; 73/146.8; 116/272
[58] Field of Search ............ 73/146.8, 744, 146.3; 116/34 R, 266, 272, 281, 283; 137/227, 228, 229

[56] References Cited

U.S. PATENT DOCUMENTS

| | | | |
|---|---|---|---|
| 1,807,752 | 6/1931 | Poster | 73/146.8 |
| 3,536,026 | 10/1970 | Miller | 73/146.3 |
| 3,670,688 | 6/1972 | Seaberg | 116/34 R |

FOREIGN PATENT DOCUMENTS 512849 2/1921 France .................. 73/744

Primary Examiner—William A. Cuchlinski, Jr.
Assistant Examiner—W. Morris Worth
Attorney, Agent, or Firm—Kirschstein, Ottinger, Israel & Schiffmiller

[57] ABSTRACT

A tire pressure indicator includes a hollow cylindrical casing mounted to an inflating valve of a tire, a transparent cap member, a piston member and a biasing spring for the piston member. The piston member is movably confined inside the hollow cylindrical casing and moves in response to the pressure in the tire. The piston member has a vertical pole which is divided into several parts, each part having a color representing a tire pressure state. The tire pressure is indicated by the color(s) that can be seen through the cap member. A hole is provided along the wall of the hollow cylindrical casing and serves as an outlet for excess air in the tire. The hole is blocked by the piston member when air pressure in the tire is deemed acceptable.

7 Claims, 4 Drawing Sheets

TIRE PRESSURE INDICATOR

BACKGROUND OF THE INVENTION

This invention relates to a pressure indicator, more particularly to a tire pressure indicator which indicates tire pressure through color coding.

Tire pressure detectors or indicators are known in the art. FIG. 1A shows a typical example of a tire pressure indicator having a piston member with an elongated pole which protrudes out of a casing, the degree of its protrusion dependent upon the amount of pressure in the tire. FIG. 1B shows an electrically operated tire pressure indicator having a light bulb D which acts as a warning signal. The bulb D lights up when, due to insufficient pressure, the conducting member C of the piston member A comes into contact with the electric contact element E. In these first two examples, the piston member A moves according to the pressure inside the space enclosed by a top casing T threaded to a bottom casing M, which is mounted to the inflating valve of a tire. A main drawback of these two examples is possible leakage of air from the tire to the surroundings due to loose threading of the connection between the top casing T and the bottom casing M.

To solve this problem, the structure of the two casings have to be improved. FIG. 2A shows an improved tire pressure indicator presented co-pending U.S. Pat. Application No. 07/392,749. In this figure, when the top casing T1 is threaded to the bottom casing M1, the piston member A1 separates the enclosed space in such a way that the air coming in from the tire can not reach the threaded portion of the two casings, thus minimizing the possibility of air leakage. Rod P, having graduations of pressure on its surface, extends downward from the top casing T1. Pressure is indicated by looking through the transparent bottom casing M1 to the level of the bottom surface of the piston member A1.

Though the device of FIG. 2A presents a solution to the problem of air leakage, the device itself is not very practical. For one thing, one would have to look very closely at the marked rod in order to determine whether there is sufficient pressure. This drawback is illustrated in FIG. 2B. Most people are not concerned with the actual value of the pressure in the tire, but rather with whether the pressure in the tire is sufficient.

Another main drawback of the prior art disclosed is that none provides for an automatic corrective means should the pressure in the tire be in excess of the required amount.

SUMMARY OF THE INVENTION

Therefore, the object of this invention is to provide a tire pressure indicator which minimizes the possibility of air leakage affecting the accuracy of the device and which is capable of indicating the level of pressure in the tire without the user having to look closely at the said device.

Another object of this invention is to provide a tire pressure indicator which indicates the level of pressure in a tire through color coding.

Still another object of this invention is to provide a tire pressure indicator which automatically corrects the pressure in the tire should it be in excess of the required amount.

Accordingly, the present invention comprises a hollow casing mounted to an inflating valve means of a tire, a transparent cap member, a piston member, and biasing means for the piston member. The piston member has a pole marked in three colors to indicate three tire pressure states: inadequate pressure, adequate pressure and excessive pressure. The piston member moves up or down inside the space enclosed by the hollow casing and the transparent cap member depending upon the pressure inside the tire. Pressure is then determined by simply viewing the color(s) through the transparent cap member.

A hole is formed in the wall of the hollow casing to serve as outlet means for excess air inside the tire. This hole can be blocked by the piston member when the pressure in the tire is deemed acceptable.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 3:
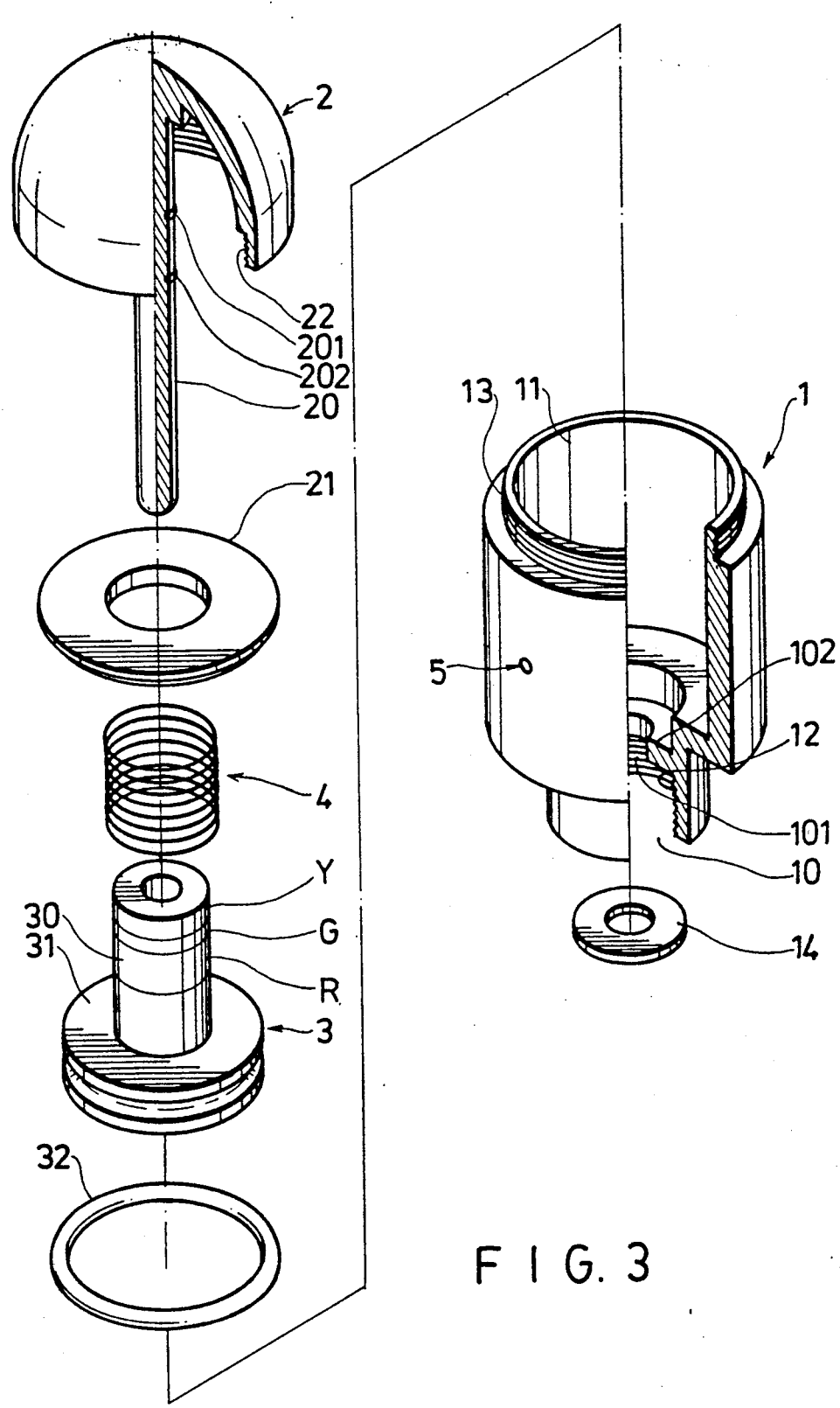
FIG. 3 is an exploded partial sectional view of the preferred embodiment.
Figure 1A:
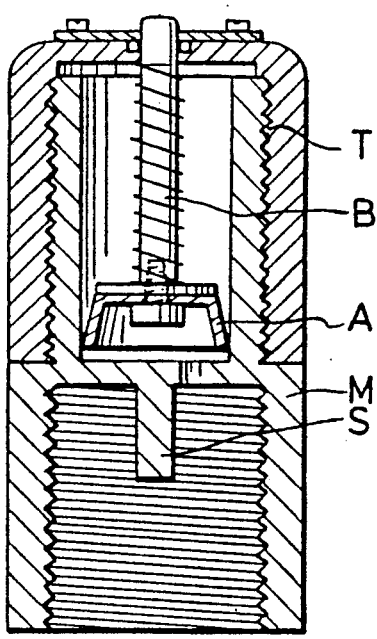
FIGS. 1A, 1B, 2A illustrate examples of prior art.
Figure 1B:
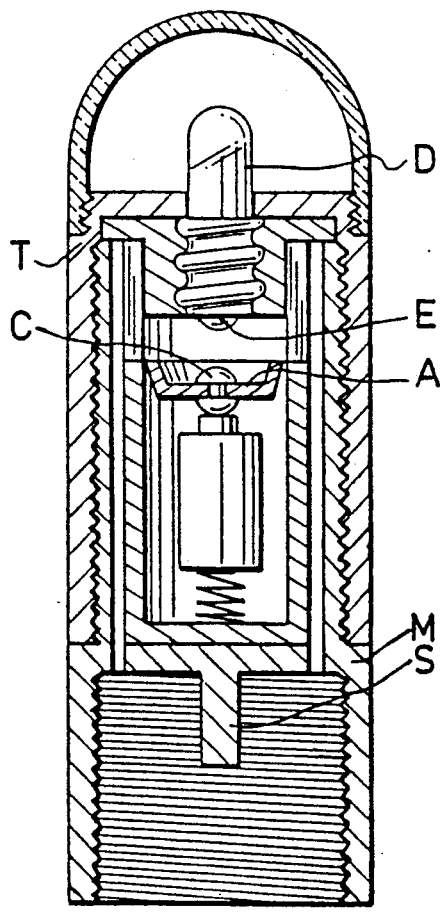

Referring to FIG. 3, the invention comprises a hollow casing 1, a dome-like cap member 2, a piston member 3, and a spring member 4. The hollow casing 1 is substantially shaped as a vertical cylinder with two open ends, the first open end 10 having internal screw threads 12 for attachment to the inflating valve means of a tire. The second open end 11 has an annular step shoulder with external screw threads 13 for attachment to the dome-like cap member 2. An air inlet hole 101 in the lower end is formed above the internal screw threads 12 by an inwardly and radially extending flange member 102. A packing member 14, shaped as a circular plate with a central hole, is placed between the flange member 102 and the internal screw threads 12, allowing air to pass only through its opening.

The piston member 3, which is movably confined in the hollow casing 1, has a circular base 31 and a vertical pole 30 projecting upwards from the center of the base 31. An axial hole is provided for in the piston member 3 and passes through the centers of the vertical pole 30 and the circular base 31. An 0-ring 32 is provided for on the side wall of the circular base 31 to tightly contact the piston member 3 to the hollow casing 1. A spring member 4 acts as biasing means for the piston member 3 and surrounds the entire length of the vertical pole 30.

Figure 4A:
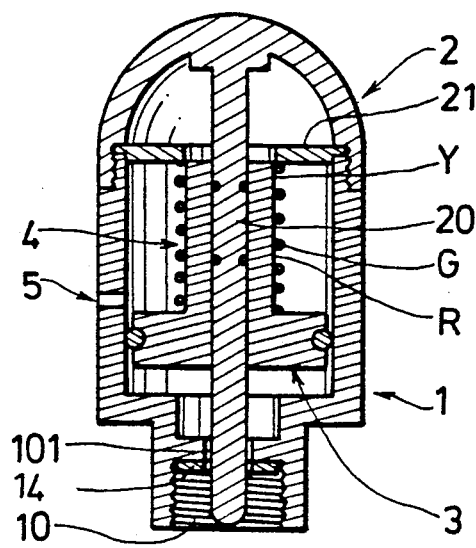
FIGS. 4A, 4B illustrate a sectional view of the preferred embodiment and the positioning of its parts when in use.
Figure 4B:
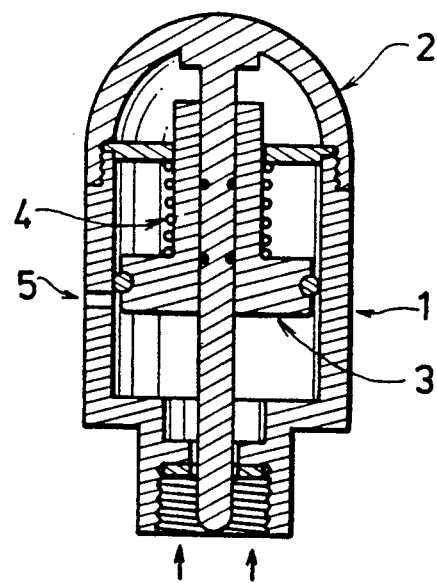
Figures 2A, 2B:
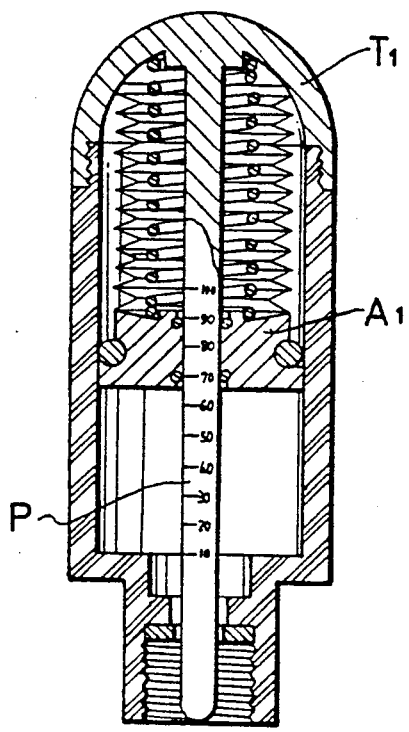
FIG. 2B illustrates the disadvantage of the prior art in FIG. 2A.

The dome-like cap member 2, made of a transparent material, has a pin 20 internally and axially protruding from its center and a plurality of internal grooves 22 for the external screw threads 13 of the hollow casing 1. A washer 21 restsoon the annular step shoulder of the hollow casing 1. When assembled, as seen in FIGS. 4A, 4B, the pin 20 passes through the centers of the washer 21, the piston member 3, the air inlet hole 101 and the packing member 14. The pin 20 pushes the inflating valve of the tire in an open position when the hollow casing 1 is mounted on the inflating valve. The air from the tire pushes the piston member 3 upwards, causing the vertical pole 30 to protrude through the center of washer 21. The diameter of the hole of washer 21 is sufficiently large to allow the vertical pole 30 to pass through but is small enough to prevent the spring member 4 from doing the same. Thus, the spring member 4 is compressed by a degree corresponding to the amount of pressure inside the tire. Two 0-rings 201, 202, are provided in the pin 20 to provide a sealing effect between the pin 20 and the vertical pole 30, thereby not allowing air to pass through the space between the pin 20 and the vertical pole 30.

Pressure indication is provided for by color coding. The vertical pole 30 is marked into three regions: the topmost region is colored yellow, indicating inadequate pressure in the tire; the middle region is colored green, indicating adequate pressure in the tire; and the bottom region is colored red, indicating excessive pressure in the tire. To determine whether pressure is adequate or not, one simply has to look at the color(s) shown in dome-like cap member 2.

In case of excess pressure, as illustrated in FIG. 4B, a hole 5 is provided for in the hollow casing 1 to serve as an outlet means for the excess air. The piston member 3 then moves down until such a point that pressure is deemed acceptable, for example two-fifths of the red region of the vertical pole 30 protrudes from the washer 21. At this point, the O-ring 32 is below the hole 5. Since 0-ring 32 provides sealing effect between the hollow casing 1 and the piston member 3, no air would pass through the hole 5.

While the present invention has been described in connection with what is considered the most practical and preferred embodiment, it is understood that the invention is not limited to the disclosed embodiments, but is intended to cover various arrangements included within the spirit and scope of the broadest interpretation so as to encompass all such modifications and equivalent arrangements.

I claim:

1. A pressure indicator for a tire with an inflating valve means, comprising:
   a hollow casing having a first end and a second end, said first end is an open end which is adapted to join with the inflating valve means of the tire, and said second end has a central hole formed therethrough;
   a piston member axially and slidably confined inside said hollow casing, said piston member having a circular base having a seal means for tightly contacting an interior wall of said hollow casing, and a vertical pole axially projecting from said circular base, in a direction from the first end toward the second end of said hollow casing, said vertical pole passing through said central holej when said piston emmber moves, said vertical pole having a height divided into several parts with each part having a color representing a tire pressure state, said circular base and said vertical pole further having an axial hole passing therethrough;
   a biasing means installed between the circular base of said piston member and the second end of said hollow casing, allowing said piston member to move in a reciprocating manner in response to pressure from the first end of said hollow casing; and
   a transparent cap member detachably joined with the second end of said hollow casing, said transparent cap member having a pin internally and axially protruding therefrom and passing through the central hole of the second end of said hollow casing, said pin being tightly but slidably inserted through said axial hole of said piston member, and said pin having a tip at the first end of said hollow casing for pushing siad inflating valve means into an open position when said first end of said hollow casing is joined with the inflating valve means.

2. A tire pressure indicator as claimed in claim 1, wherein said hollow casing has a hole to serve as an outlet means for excess air in the tire and is disposed in such a manner that it can be blocked by said piston member when pressure in the tire is acceptable.

3. A tire pressure indicator as claimed in claim 1, wherein said biasing means is a spring member surrounding the entire height of said vertical pole of said piston member.

4. A tire pressure indicator as claimed in claim 3, an O-ring wherein said seal means comprises surroudning a side wall of the circular base of said piston member for tightly contacting said circular base to said hollow casing.

5. A tire pressure indicator as claimed in claim 4, further comprising at least one O-ring disposed on said pin of said transparent cap member for tightly contacting said pin to said piston member.

6. A tire pressure indicator as claimed in claim 5, wherein said transparent cap member is substantially dome-like in shape.

7. A tire pressure indicator as claimed in claim 6, wherein said vertical pole is divided into a topmost part indicating inadequate pressure; a middle part indicating adequate pressure; and a bottom part indicating excessive pressure.

* * * * *